US007721056B2

(12) United States Patent
Wake

(10) Patent No.: US 7,721,056 B2
(45) Date of Patent: May 18, 2010

(54) STORAGE SYSTEM, DISK ARRAY APPARATUS, VOLUME PRESENTATION METHOD, AND DATA CONSISTENCY CONFIRMATION METHOD

(75) Inventor: Hiroshi Wake, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 455 days.

(21) Appl. No.: 11/330,184

(22) Filed: Jan. 12, 2006

(65) Prior Publication Data
US 2007/0118690 A1 May 24, 2007

(30) Foreign Application Priority Data
Nov. 18, 2005 (JP) .............................. 2005-333547

(51) Int. Cl.
*G06F 12/16* (2006.01)
(52) U.S. Cl. .................. 711/162; 711/114; 707/654
(58) Field of Classification Search ........................ None
See application file for complete search history.

(56) References Cited

U.S. PATENT DOCUMENTS

| 5,893,140 | A  | * | 4/1999 | Vahalia et al. | .............. 711/118 |
| 6,446,175 | B1 | * | 9/2002 | West et al. | .................. 711/162 |
| 6,772,306 | B2 | * | 8/2004 | Suzuki et al. | ............... 711/162 |
| 7,020,744 | B2 | * | 3/2006 | Nishikawa et al. | .......... 711/114 |
| 2001/0037323 | A1 | * | 11/2001 | Moulton et al. | ................. 707/1 |
| 2003/0204690 | A1 |   | 10/2003 | Yamada et al. | |
| 2004/0010490 | A1 | * | 1/2004 | Mikami et al. | .................. 707/3 |
| 2005/0193245 | A1 | * | 9/2005 | Hayden et al. | ................ 714/13 |
| 2008/0034021 | A1 | * | 2/2008 | De Spiegeleer | ............. 707/204 |

FOREIGN PATENT DOCUMENTS

JP    2003-316635    11/2003

* cited by examiner

*Primary Examiner*—Shane M Thomas
*Assistant Examiner*—Kaushikkumar Patel
(74) *Attorney, Agent, or Firm*—Antonelli, Terry, Stout & Kraus, LLP.

(57) ABSTRACT

The present invention proposes a storage system having a plurality of disk array apparatuses managed separately by different managers, that can considerably improve the reliability of data backup. The invention provides a storage system, in which a first disk array apparatus includes a storing unit for storing volume information, which is information about the configuration of the volume; an extracting unit for, when receiving an external backup instruction, extracting, according to the backup instruction, volume information, as backup volume information from the volume information stored in the storage unit, about a backup target volume; and a presenting unit for presenting the backup volume information extracted by the extracting unit to an external device, and the second disk array apparatus includes an allocating unit for allocating a corresponding second volume to the backup target volume by referring to the backup volume information presented by the presenting unit.

12 Claims, 12 Drawing Sheets

| JOB ID | VOLUME ID |
|--------|-----------|
| JOB 1  | PV1·PV2   |
| JOB 2  | PV4·PV5   |
| JOB 3  | PV3       |
| ⋮      | ⋮         |

| VOLUME ID | VOLUME CAPACITY | CONNECTED HOST ID | RAID TYPE | IP ADDRESS |
|---|---|---|---|---|
| PV1 | 10GB | HOST 1 | 1 | 10.208.118.10 |
| PV2 | 20GB | HOST 1 | 2 | 10.208.118.10 |
| PV3 | 30GB | HOST 1 | 2 | 10.208.118.10 |
| PV4 | 25GB | HOST 1 | 3 | 10.208.118.10 |
| PV5 | 15GB | HOST 1 | 4 | 10.208.118.10 |
| PV6 | 40GB | HOST 2 | 6 | 10.208.118.11 |
| ⋮ | ⋮ | ⋮ | ⋮ | ⋮ |

| | DATA | WRITTEN | UNWRITTEN |
|---|---|---|---|
| from | 1 | 1 | N/A |
| to | 4 | 4 | N/A |

71A, 72A, 73A, 74A

| DATA | HASH VALUE |
|---|---|
| 4 | XXX |

| | DATA | WRITTEN | UNWRITTEN |
|---|---|---|---|
| from | 1 | 1 | 3 |
| to | 3 | 2 | 3 |

| | DATA | WRITTEN | UNWRITTEN |
|---|---|---|---|
| from | 1 | 1 | N/A |
| to | 3 | 3 | N/A |

| | DATA | WRITTEN | UNWRITTEN |
|---|---|---|---|
| from | 1 | 1 | 4 |
| to | 4 | 3 | 4 |

| | DATA | WRITTEN | UNWRITTEN |
|---|---|---|---|
| from | 1 | 1 | N/A |
| to | 4 | 4 | N/A |

72B — 73B — 74B — 71B

STORAGE SYSTEM, DISK ARRAY APPARATUS, VOLUME PRESENTATION METHOD, AND DATA CONSISTENCY CONFIRMATION METHOD

CROSS-REFERENCES TO RELATED APPLICATIONS

This application relates to and claims priority from Japanese Patent Application No. 2005-333547, filed on Nov. 18, 2005, the entire disclosure of which is incorporated herein by reference.

BACKGROUND OF THE INVENTION

The present invention relates to a storage system, a disk array apparatus, a volume presentation method, and a data consistency confirmation method preferably applied to e.g. a storage system that performs volume copy between disk array apparatuses.

In recent years, with the explosive increase in data managed at corporations and other places storage systems that store large volumes of data by mutually connecting a plurality of disk array apparatuses with, e.g. a SAN (Storage Area Network) have been widely used.

In this kind of storage system, volume copy is performed so that all data in a logical volume (hereinafter referred to as a "primary volume") for storing data in a disk array apparatus that is a backup source (hereinafter referred to as "backup source disk array apparatus") is copied at a certain time via the SAN into a logical volume for backup (hereinafter referred to as "sub-volume") in a disk array apparatus that is a backup destination (hereinafter referred to as "backup destination disk array apparatus"), which is a different disk array apparatus, and thereby the data in the primary volume can be backed up.

Moreover, a management arrangement for the above described storage system has been proposed recently, in which a manager belonging to an external management company specializing in backup, manages the backup destination disk array apparatus by outsourcing.

For example, this kind of storage systems includes a system where a management service provider performs data backup services for users by utilizing idle resources owned by a plurality of storage service providers (see JP-A-2003-316635).

SUMMARY OF THE INVENTION

However, the following problems are likely to occur if the storage system is actually operated in the above management arrangement.

In a storage system in the above management arrangement, the manager for the backup source disk array apparatus manages only the primary volume in this backup source disk array apparatus, and the manager for the backup destination disk array apparatus manages only the sub-volume in the backup destination disk array apparatus.

Because only the primary volume is managed in the backup source disk array apparatus, a corresponding sub-volume cannot be allocated to the primary volume. In the backup destination disk array apparatus, even though a corresponding sub-volume can be allocated to the primary volume, the apparatus cannot recognize the backup target primary volume.

Therefore, when data backup processing is performed in the storage system in the above management arrangement, it is necessary to make the backup destination disk array apparatus recognize the backup target primary volume to allocate a corresponding sub-volume to the primary volume.

Moreover, in a storage system in the above management arrangement, a manager belonging to a management company specializing in backup manages the backup destination disk array apparatus. Therefore, from a security perspective, it is necessary to configure the backup destination disk array apparatus so that the data in the sub-volume cannot be consulted and changed. Accordingly, whether or not backup of the data in the primary volume to the sub-volume in the backup destination disk array apparatus has been completed cannot be confirmed.

For this reason, whether or not data has been restored to a primary volume cannot be understood when data in the sub-volume is restored to the primary volume while a failure is occurring in the primary volume in the storage system in the above management arrangement.

The present invention has been made in light of the above points, and it is an object of the present invention to propose a storage system, a disk array apparatus, a volume presentation method, and a data consistency confirmation method that can considerably improve the reliability of data backup processing when a plurality of disk array apparatuses is managed separately by different managers.

To solve the above-stated problems, the present invention provides a storage system having a first disk array apparatus that provides a first volume for storing data transmitted from a host computer and a second disk array apparatus that provides a second volume for storing backup data of the first volume. The first disk array apparatus includes a storing unit for storing volume information, which is information about the configuration of the volumes; an extracting unit for, when receiving an external backup instruction, extracting, according to the backup instruction, volume information, as backup volume information from the volume information stored in the storing unit, about a backup target volume; and a presenting unit for presenting the backup volume information extracted by the extracting unit to the second disk array apparatus. The second disk array apparatus has an allocating unit for allocating a corresponding second volume to the backup target volume by referring to the backup volume information presented by the presenting unit.

Accordingly, even when only the first volume in the first disk array apparatus is managed in the first disk array apparatus and only the second volume in the second disk array apparatus is managed in the second disk array apparatus, it is possible to make the second disk array apparatus recognize the backup target volume and allocate the corresponding second volume to the backup target volume when data backup processing is performed.

The present invention also provides a disk array apparatus that provides a volume for storing data transmitted from a host computer, including a storing unit for storing volume information, which is information about the configuration of the volume; an extracting unit for, when receiving an external backup instruction, extracting, according to the backup instruction, volume information, as backup volume information from the volume information stored in the storing unit, about a backup target volume; and a presenting unit for presenting the backup volume information extracted by the extracting unit to an external device.

Accordingly, even when only the first volume in the first disk array apparatus is managed in the first disk array apparatus and only the second volume in the second disk array apparatus is managed in the second disk array apparatus, it is possible to make the second disk array apparatus recognize the backup target volume and allocate a corresponding second volume to the backup target volume when data backup processing is performed.

The present invention also provides a volume presentation method for a disk array apparatus that provides a volume for storing data transmitted from a host computer, including: a first step of, when receiving an external backup instruction, extracting, according to a backup instruction, volume information as backup volume information from the volume information stored in a storing unit for storing volume information, which is information about the configuration of the volume, about a backup target volume; and a second step of presenting the backup volume information extracted in the first step to an external device.

Accordingly, even when only the first volume in the first disk array apparatus is managed in the first disk array apparatus and only the second volume in the disk array apparatus is managed in the second disk array apparatus, it is possible to make the second disk array apparatus recognize the backup target volume and allocate a corresponding second volume to the backup target volume when data backup processing is performed.

The present invention also provides a storage system having a first disk array apparatus that provides a first volume for storing data transmitted from a host computer and a second disk array apparatus that provides a second volume for storing backup data of the first volume. The first disk array apparatus includes: a first calculating unit for calculating a first parameter based on a one-way function from data for updating data in the first volume transmitted from the host computer; and a transmitting unit for transmitting the first parameter calculated by the first calculating unit and the update data to the second disk array apparatus. The second disk array apparatus includes: a second calculating unit for calculating a second parameter based on the one-way function from the update data transmitted from the first disk array apparatus; and a checking unit for checking whether or not the second parameter calculated by the second calculating unit coincides with the first parameter transmitted from the first disk array apparatus.

Accordingly, even when only the first volume in the first disk array apparatus is managed in the first disk array apparatus; only the second volume in the second disk array apparatus is managed in the second disk array apparatus; and data in the second volume cannot be consulted and changed in the second disk array apparatus from a security perspective, the consistency between the data stored in the backup target volume and the data stored in the second volume can be assured.

The present invention also provides a data consistency confirmation method for a storage system having a disk array apparatus that provides a first volume for storing data transmitted from a host computer and a second disk array apparatus that provides a second volume for storing backup data of the first volume, including: a first step of calculating a first parameter based on a one-way function from data for updating data in the first volume transmitted from the host computer; a second step of transmitting the first parameter calculated in the first step and the update data to the second disk array apparatus; a third step of calculating a second parameter based on the one-way function from the update data transmitted from the first disk array apparatus; and a fourth step of checking whether or not the second parameter calculated in the third step coincides with the first parameter transmitted from the first disk array apparatus.

Accordingly, even when only the first volume in the first disk array apparatus is managed in the first disk array apparatus; only the second volume in the second disk array apparatus is managed in the second disk array apparatus; and the data in the second volume cannot be consulted and changed in the second disk array apparatus from the viewpoint of security, the consistency between the data stored in the backup target volume and the data stored in the second volume can be assured.

According to the present invention, even when only the first volume in the first disk array apparatus is managed in the first disk array apparatus and the second volume in the second disk array apparatus is managed in the second disk array apparatus, it is possible to make the second disk array apparatus recognize a backup target volume and allocate a corresponding second volume to the backup target volume when data backup processing is performed. Therefore, a storage system that can considerably improve the reliability of data backup processing can be configured even when those disk array apparatuses are managed separately by different managers.

BRIEF DESCRIPTION OF THE DRAWINGS

FIGS. 16A to FIGS. 16D are schematic diagrams illustrating transition in a data update state table.

DETAILED DESCRIPTION OF PREFERRED EMBODIMENT

One embodiment of the present invention will be hereinafter described with reference to the drawings.

(1) Configuration of Storage System 1 According to the Present Embodiment

Figure 1:
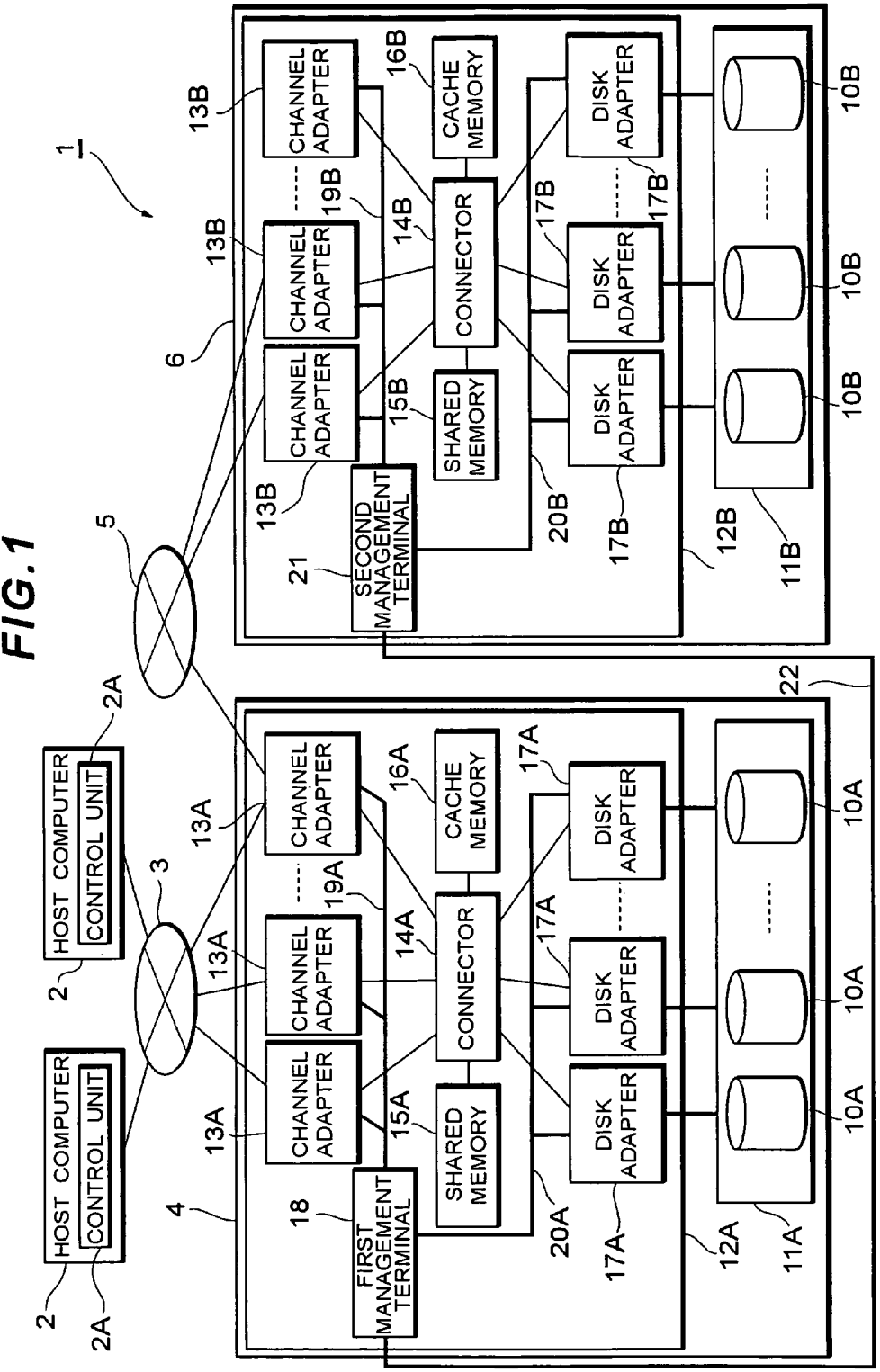
FIG. 1 is a block diagram showing a configuration of a storage system according to an embodiment of the present invention.

FIG. 1 shows an example of a configuration of a storage system 1 according to the present embodiment. In the storage system 1, a plurality of host computers 2 is connected via a first network 3 to a disk array apparatus that is a backup source (hereinafter referred to as "backup source disk array apparatus") 4, and this backup source disk array apparatus 4 is connected via a second network 5 to a disk array apparatus that is a backup destination (hereinafter referred to as "backup destination disk array apparatus") 6.

In the present embodiment described here, only one backup source disk array apparatus 4 is connected via the second network 5 to the backup destination disk array apparatus 6. However, the present invention is not limited to this case, and two or more backup source disk array apparatuses 4 connected to one or a plurality of host computers 2 may be connected to the backup destination disk array apparatus 6.

The host computer 2, which is a host system, is a computer device such as a personal computer, a workstation, or a mainframe, having a control unit 2A equipped with information processing resources such as a CPU (Central Processing Unit) and memory. The host computer 2 also includes information input devices (not shown) such as a keyboard, a switch or pointing device, and microphone, and information output devices (not shown) such as a monitor display and a speaker.

The first network 3 is a SAN (Storage Area Network), a LAN (Local Area Network), the Internet, a public line, or a dedicated line. Communication via the first network 3 between the host computer 2 and the backup source disk array apparatus 4 is performed according to Fiber Channel Protocol when the first network 3 is a SAN, and according to TCP/IP (Transmission Control Protocol/Internet Protocol) when the first network 3 is a LAN.

The backup source disk array apparatus 4 includes: a storage device 11A, having a plurality of disk devices 10A that store data; and a control unit 12A that controls data input and output to/from the storage device 11A.

Each disk device 10A in the storage device 11A may be an expensive disk such as an SCSI (Small Computer System Interface) disk, or an inexpensive disk such as a SATA (Serial AT Attachment) disk or an optical disk.

Each disk device 10A in the storage device 11A is operated by the control unit 12A, based on a RAID system. One or a plurality of logical volumes (hereinafter referred to as "logical volume(s)") is set on a physical storage area provided by one or a plurality of disk devices 10A. Data is stored in the logical volume(s).

The control unit 12A includes: a plurality of channel adapters 13A; a connector 14A; a shared memory 15A; a cache memory 16A; a plurality of disk adapters 17A; and a first management terminal 18.

Each channel adapter 13A is a microcomputer system having a microprocessor, memory, and a communication interface, and has a port for connection with the first network 3 or the second network 5. The channel adapter 13A interprets various commands transmitted from the host computer 2 via the first network 3 and performs relevant processing. A network address (e.g. IP address or WWN) for identifying the respective ports is allocated to the port of each channel adapter 13A, and the channel adapter 13A can act individually as NAS (network attached storage).

The connector 14A is connected to the channel adapters 13A, the shared memory 15A, the cache memory 16A, and the disk adapters 17A. Transmission and reception of data and commands between the channel adapters 13A, the shared memory 15A, the cache memory 16A, and the disk adapters 17A is performed via the connector 14A. The connector 14A is a switch such as an ultrahigh-speed cross bus switch that performs data transmission with high-speed switching, or a bus.

The shared memory 15A and the cache memory 16A are storage memory shared by the channel adapters 13A and the disk adapters 17A. The shared memory 15A is used mainly to store system configuration information relating to the entire backup source storage apparatus 4, and commands. The cache memory 16A is used mainly to temporarily store data that is to be input and output to/from the backup source storage apparatus 4.

Each disk adapter 17A is a microcomputer system having a microprocessor and memory, and functions as an interface that performs protocol control during communication with the disk devices 10A in the storage device 11A. The disk adapter 17A is connected via, e.g. a fibre channel cable to a corresponding disk device 10A in the storage device 11A, and data transmission and reception to/from that disk device 10A is performed according to Fibre Channel Protocol.

The management terminal 18 is a terminal device that controls operations in the entire backup source disk array apparatus 4, the management terminal being, e.g. a note-type personal computer. The management terminal 18 is connected via a LAN 19A to each channel adapter 13A, and connected via a LAN 20A to each disk adapter 17A. A manager can define system configuration information and logical volume configuration information using the management terminal 18, store the system configuration information defined above via the channel adapter 13A or the disk adapter 17A and the connector 14A in the shared memory 15A, and store the logical volume configuration information in the storage device 11A.

The backup destination disk array apparatus 6 is configured in the same way as the backup source disk array apparatus 4, except that the backup destination disk array apparatus 6 is managed by a manager belonging to an outsourced management company specializing in backup different from the backup source disk array apparatus 4 manager, and the content of the data backup processing described later is different from that performed in the backup source disk array apparatus 4. In FIG. 1, components in the backup destination disk array apparatus 6 corresponding to those in the backup source disk array apparatus 4 are provided with the same reference numbers, but with a reference character "B," instead of "A."

A second management terminal 21 in the backup destination disk array apparatus 6 is connected via a network 22, such as a LAN, to the first management terminal 18 in the backup source disk array apparatus 4. Any information required can be exchanged between the second management terminal 21 in the backup destination disk array apparatus 6 and the first management terminal 18 in the backup source disk array apparatus 4, via this network 22.

The flow of data input and output between the host computer 2 and the backup source disk array apparatus 4 in the storage system 1 will be described below. When an instruction to write data to a logical volume set in the backup source disk array apparatus 4 is input by a user, the host computer 2 transmits a data write request, which is a command corresponding to that instruction, and write data via the first network 3 to a predetermined channel adapter 13A in the backup source disk array apparatus 4.

The channel adapter 13A in the backup source disk array apparatus 4, receiving the data write request, translates the address that the data is written to designated in the data write request into an actual address recognized by the backup source disk array apparatus 4. For this address translation, an address translation table that contains the address of the storage area provided by the backup source disk array apparatus 4 and the corresponding address of the storage area recognized by the host computer 2 is stored in the shared memory 15A in the backup source disk array apparatus 4. The channel adapter 13A translates the address that the data is written to, contained in the data write request, into an actual address recognized by the backup source disk array apparatus 4 by referring to this address translation table.

After that, the channel adapter 13A writes that data write request to the shared memory 15A. The channel adapter 13A also writes the write data to the cache memory 16A.

Each disk adapter 17A constantly monitors the shared memory 15A. When the corresponding disk adapter 17A detects that the data write request has been written to the shared memory 15A, it translates the data write request designating a logical address into a data write request designating an actual physical address, reads the write data from the cache memory 16A, and writes this data to the position corresponding to the address in the relevant disk device 10A.

When an instruction to read data stored in a predetermined logical volume in the backup source disk array apparatus 4 is input by a user, the host computer 2 transmits a data read request, which is a command corresponding to that instruction, to a predetermined channel adapter 13A in the backup source disk array apparatus 4.

The channel adapter 13A in the backup source disk array apparatus 4 receiving this data read request translates the address that the data is read from, contained in the data read request, into an actual address recognized by the backup source disk array apparatus 4 and the backup destination disk array apparatus 6 using the above described address translation table.

This channel adapter 13A then writes the data read request to the shared memory 15A. When the corresponding disk adapter 17A detects that the read command has been written to the shared memory 15A, it translates the data read request designating a logical address into a data read request designating a physical address, and reads the data from the position corresponding to the address in the relevant disk device 10A based on the translated address.

The disk adapter 17A also writes the data read from the disk device 10A to the cache memory 16A and writes the read command to the shared memory 15A. Each channel adapter 13A constantly monitors the shared memory 15A. When the relevant channel adapter 13A detects a the read command has been written to the shared memory 15A, it reads the relevant data from the cache memory 16A according to the read command and transmits the data via the first network 3 to the relevant host computer 2.

In this manner, data is written and read to/from a logical volume provided by the backup source disk array apparatus 4 according to the data input/output request from the user in the storage system 1.

(2) Data Backup Processing According to the Present Embodiment

Figure 13:
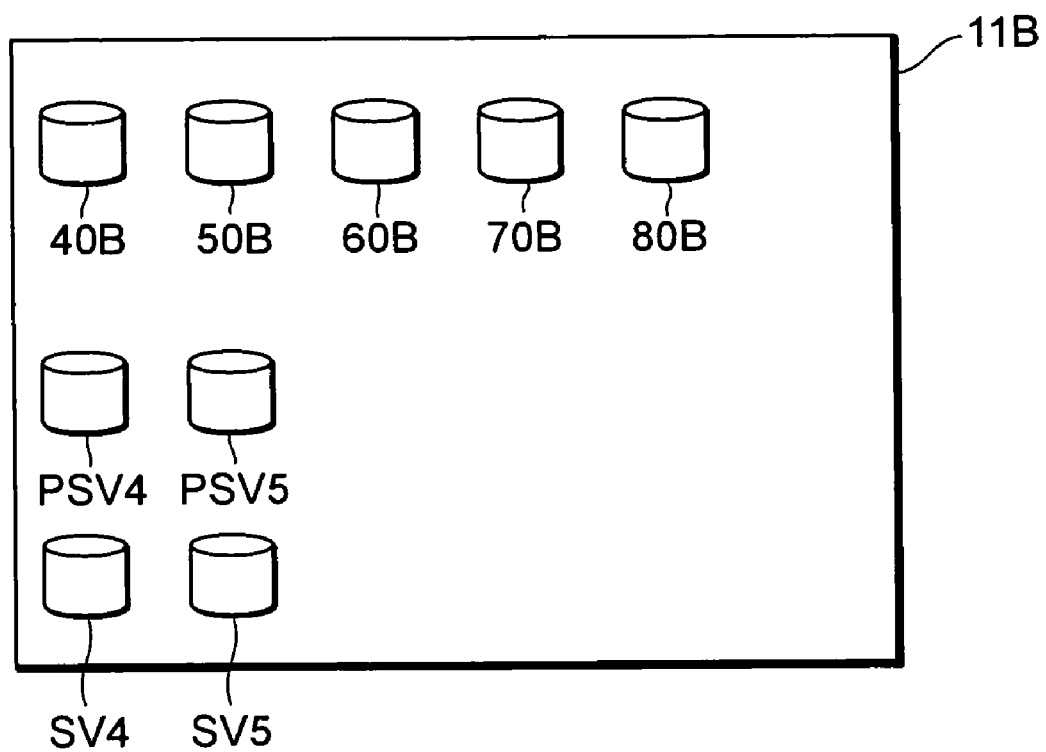
FIG. 13 is a schematic diagram illustrating a storage device.

Next, the data backup processing in the storage system 1 according to the present embodiment will be described. Hereinafter, a logical volume in the backup source disk array apparatus 4 for inputting and outputting data is referred to as "primary volume PV" (FIG. 14), and a logical volume in the backup destination disk array apparatus 6 for backing up the data in the primary volume PV is referred to as "sub-volume SV" (FIG. 13).

(2-1) Volume Allocation Processing According to the Present Embodiment

First, volume allocation processing in the storage system 1 according to the present embodiment will be described. In the storage system 1 according to this embodiment, when an operation unit (not shown) in the first management terminal 18 is instructed by a manager to perform data backup, volume information about a backup target primary volume PV is extracted from the volume information, which is information about the configuration of primary volumes PVs, and the extracted information about the backup target volume as backup volume data is presented to the backup destination disk array apparatus 6 to allocate a corresponding sub-volume SV to the backup target primary volume PV.

Figures 2, 3:
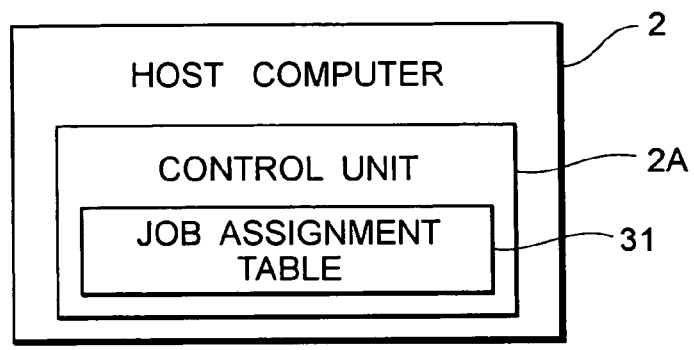
FIG. 2 is a block diagram showing a configuration of a host computer.
FIG. 3 is a schematic diagram illustrating a storage device.

In the storage system according to this embodiment, a job assignment table 31 is stored in the memory in the control unit 2A in each host computer 2, as shown in FIG. 2. The job assignment table 31 contains, as shown in FIG. 3, a job ID column 32 that stores an ID for each job performed by each host computer 2, and a primary volume ID column 33 storing an ID for primary volume assigned to store the job data.

Figures 4, 5:
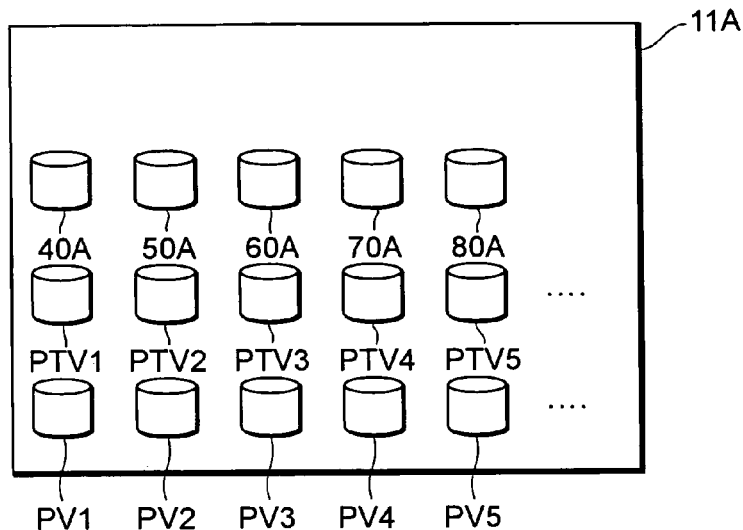
FIG. 4 is a schematic diagram illustrating a job assignment table.
FIG. 5 is a schematic diagram illustrating a volume configuration information table.

In the storage system 1, a plurality of primary volumes PVs and primary volume data temporary storage volumes PTVs for each primary volume PV are set in the storage device 11A in the backup source disk array apparatus 4, as shown in FIG. 4. The primary volume data temporary storage volume PTV is designed to temporarily store write data before this write data is written to the primary volume PV.

Also, in the storage system 1, a program storage volume 40A storing a backup control program 41A; a volume configuration information storage volume 50A storing a volume configuration information table 51A; a backup volume information storage volume 60A storing a backup volume information table 61A; an update state storage volume 70A storing a data update state management table 71A; and a hash value storage volume 80A storing a hash value table 81A are set in the storage device 11A in the backup source disk array apparatus 4.

The control program 41A is a program for controlling the entire backup source disk array apparatus 4 relating to the data backup processing, and a hash value can be calculated from write data based on a hash function contained in the control program 41A.

The hash function is a kind of one-way function that produces data (hash values) of a fixed length from original data, in which it is easy to derive a result from an initial value, but extremely difficult to calculate the initial value from the result.

The volume configuration information table 51A stores various configuration information about the primary volume PV and contains, as shown in FIG. 5, a volume ID column 52A storing the ID for a primary volume PV; a volume capacity column 53A storing the capacity of the primary volume PV; a connected host ID column 54A storing the ID for a host computer 2 connected to the primary volume PV; a RAID type column 55A storing the RAID type of the primary volume PV; and an IP address column 56A storing the IP address of the host computer 2 connected to the primary volume PV.

Figure 6:
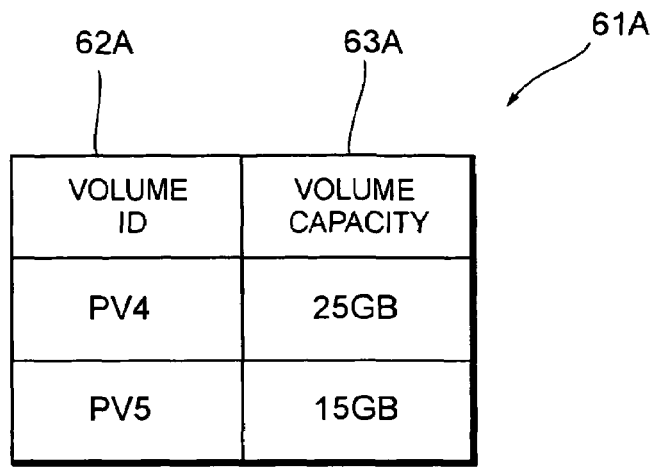
FIG. 6 is a schematic diagram illustrating a backup volume information table.

The backup volume information table 61A is a table for storing information about the configuration of a primary volume PV necessary for performing data backup processing. As shown in FIG. 6, it contains a volume ID column 62A storing the ID for a backup target primary volume PV; and a volume capacity column 63A storing the capacity of the primary volume PV.

The data update state management table 71A is a table for managing the update state in each primary volume updated by writing the write data from the primary volume data temporary storage volume PTV to the primary volume PV.

Figure 7:
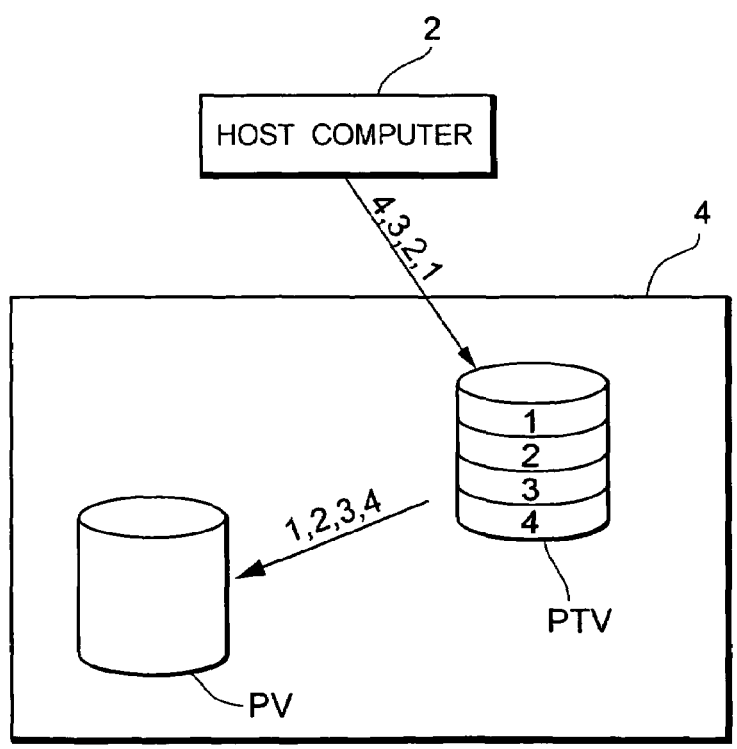
FIG. 7 is a schematic diagram illustrating data update processing.

In the storage system 1 according to this embodiment, the write data transmitted from the host computer 2 is sequentially stored in the primary volume data temporary storage volume PTV, and the write data stored in the primary volume data temporary storage volume PTV is written to the primary volume PV at a predetermined time as needed, to update the primary volume PV, as shown in FIG. 7. Accordingly, both write data for which the primary data PV has been updated and data for which the primary data PV has not yet been updated have to be managed.

Figures 8, 9, 10:
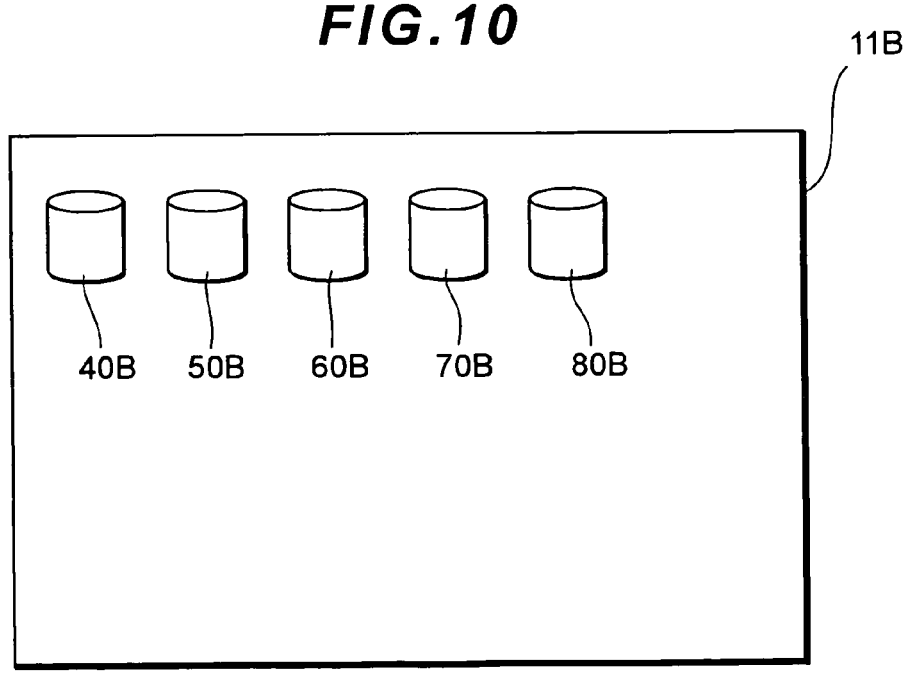
FIG. 8 is a schematic diagram illustrating a data update state table.
FIG. 9 is a schematic diagram illustrating a hash value table.
FIG. 10 is a schematic diagram illustrating a storage device.

Therefore, the data update state management table 71A contains, as shown in FIG. 8, a data column 72A storing write data; a written data column 73A storing the write data that has been written; and unwritten data column 74A storing the write data that has not yet been written. In this table, "1" represents "write data 1" that has been transmitted initially from the host computer 2, and "4" represents "write data 4" transmitted from the host computer 2 for the fourth time. "N/A" indicates that there is no relevant write data.

In the data column 72A, the written data column 73A, and the unwritten data column 74A, the "from" row shows the initial data of the write data, write data that has already been written, and write data that has not yet been written, and the "to" row shows the last data of the write data, write data that has already been written, and write data that has not yet been written.

In the data update state management table 71A shown in FIG. 8, the primary volume data temporary storage volume PTV stores write data 1 to 4 since the "from" row in the data column 72A has "1" and the "to" row has "4"; the write data 1 to 4 stored in the primary volume data temporary storage volume PTV have been written to the primary volume PV and this primary volume PV has been updated since the "from" row in the written data column 73A has "1" and the "to" row has "4"; and there is no unwritten write data in the primary volume PV since the "from" row in the unwritten data column 74A has "N/A" and the "to" row also has "N/A."

The hash value table 81A is a table for storing a hash value for the write data for each primary volume PV, and contains, as shown in FIG. 9, a data column 82A storing write data that a hash value is calculated for; and a hash value column 83A storing a hash value for the write data.

Meanwhile, as shown in FIG. 10, the storage device 11B in the backup destination disk array apparatus 6 in the storage system 1 includes volumes corresponding to the program storage volume 40A storing the backup control program 41A; the primary volume configuration information storage volume 50A storing the volume configuration information table 51A; a backup volume information storage volume 60A storing the backup volume information table 61A; the update state storage volume 70A storing the data update state management table 71A; and the hash value storage volume 80A storing the hash value table 81. In the storage device 11B shown in FIG. 10, those volumes are provided with the same reference numbers as the volumes in the storage device 11A and the reference character "B" instead of "A."

The first and second management terminals 18 and 21 separately run the backup control programs 41A and 41B in the memory (not shown) in those management terminals 18 and 21 and execute control processing relating to data backup according to the backup control programs 41A and 41B. A sequence of control processing relating to the data backup is performed in cooperation between the first and second management terminals 18 and 21 and between the control programs 41A and 41B.

Figure 11:
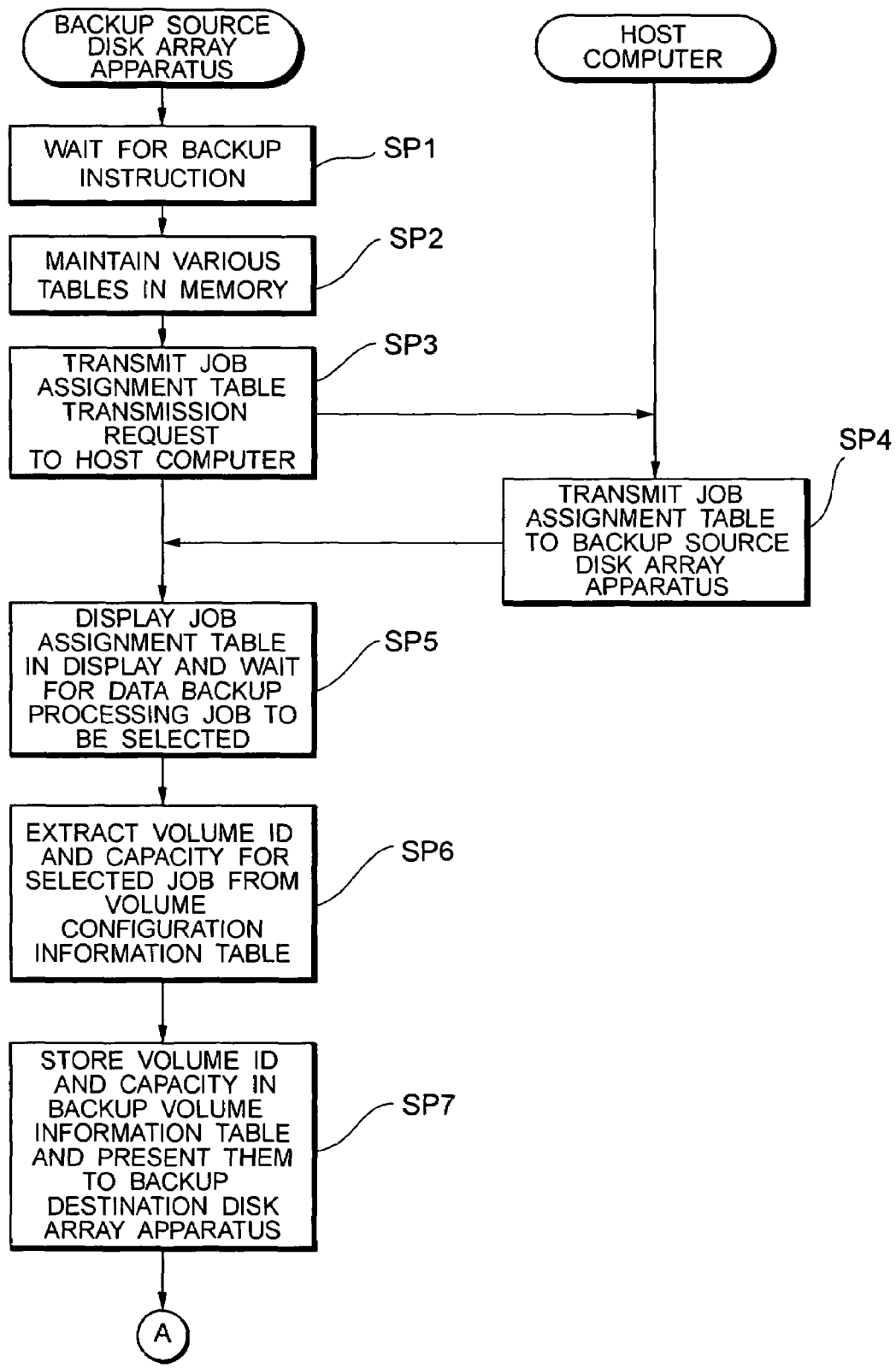
FIG. 11 is a flowchart illustrating a volume allocation processing sequence.
Figure 12:
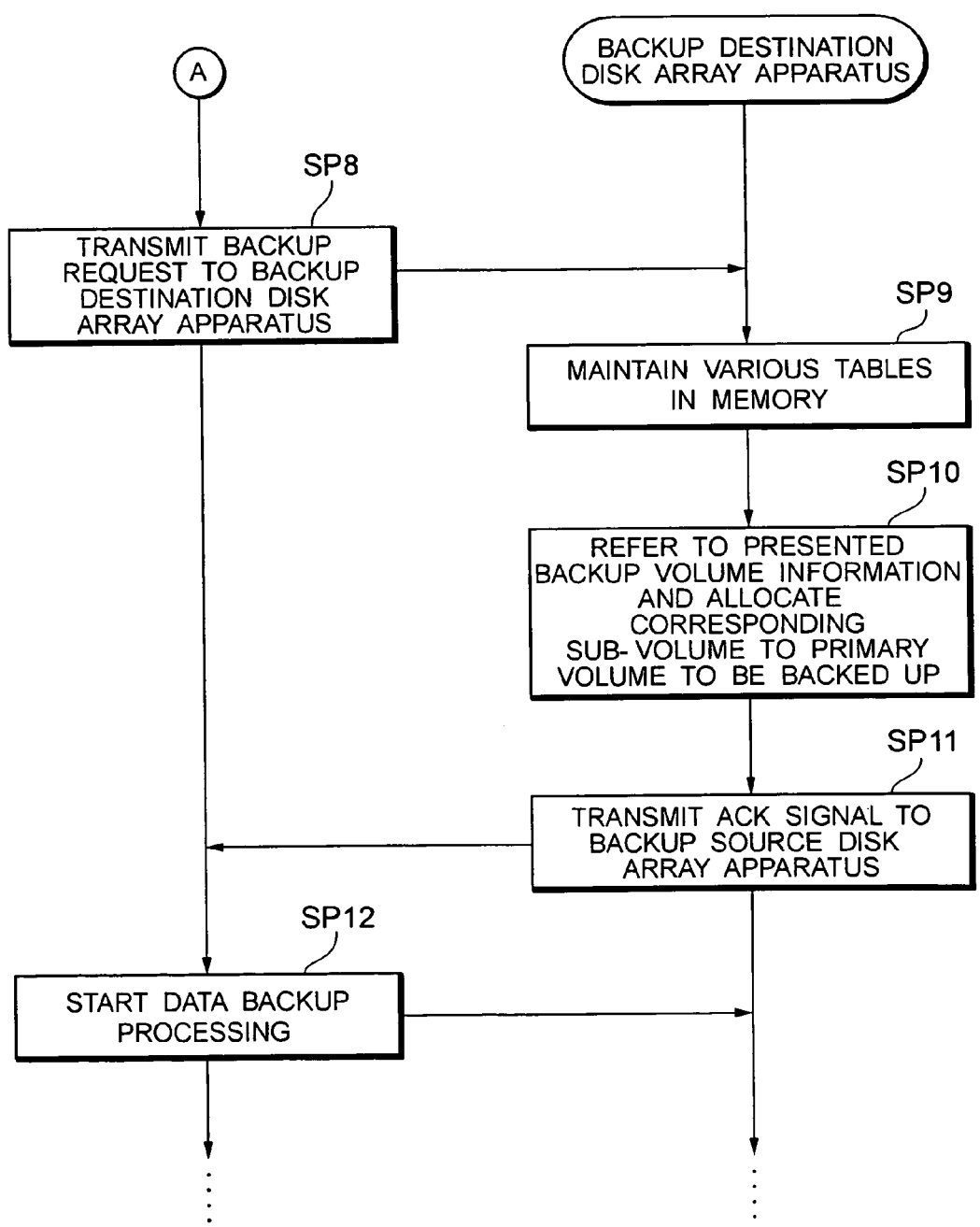
FIG. 12 is a flowchart illustrating a volume allocation processing sequence.

FIGS. 11 and 12 show a flowchart showing a specific sequence of volume presentation processing for allocating a backup target primary volume PV in the backup source disk array apparatus 4 to a sub-volume SV in the backup destination disk array apparatus 6.

Initially, the first management terminal 18 in the backup source disk array apparatus 4 waits in standby mode for an instruction from a manager to be received via the operation unit (not shown) in the first management terminal according to the volume allocation processing sequence RT1 shown in FIGS. 11 and 12 (SP1).

The first management terminal 18, receiving the backup instruction, reads the volume configuration information table 51A, the backup volume information table 61A, the data update state management table 71A, and the hash value table 81A, from the primary volume configuration information storage volume 50A, the backup volume information storage volume 60A, the update state storage volume 70A, and the hash value storage volume 80A in the storage device 11A respectively, and those tables are maintained in the memory (not shown) in the first management terminal 18 (SP2).

Subsequently, the first management terminal 18 transmits a job assignment table transmission request via the channel adapter 13A to each host computer 2 to require transmission of the job assignment table 31 stored in the memory in the control unit 2A in each host computer 2 (SP3).

Each host computer 2, receiving the job assignment table transmission request from the first management terminal 18, reads the job assignment table 31 from the memory and transmits it via the channel adapter 13A to the first management terminal 18 (SP4).

The first management terminal 18 receiving the job assignment table 31 from each host computer 2 displays this job assignment table 31 on a display (not shown) in the first management terminal 18 and waits in standby mode for a data backup processing job to be selected from among the jobs in the job assignment table 31 (SP5).

When a data backup processing job is selected, the first management terminal 18 extracts the primary volume ID assigned to the job ID for the selected job and the capacity for the primary volume ID as configuration information necessary for performing the data backup processing for the backup target primary volume PV, from the volume configuration information table 51A (SP6).

For example, when "job 2" is selected from among the job IDs in the job assignment table 31 shown in FIG. 3, the first management terminal 18 extracts "PV4" and "PV5," which are the primary volume IDs assigned to "job 2," and "25 G" and "15 GB," which are the capacities of those primary volumes, from the volume configuration information table 51A.

After that, the first management terminal 18 stores the extracted primary volume IDs and capacities for those primary volume IDs in the backup volume information table 61A, and presents those primary volume IDs and the primary volume capacities stored in the backup volume information table 61A to the backup destination disk array apparatus 6 by using the backup volume information table 61A as a shared table between the backup source disk array apparatus 4 and the backup destination disk array apparatus 6 (SP7).

For example, the first management terminal 18 stores "PV4" and "PV5," which are the extracted primary volume IDs, and "25 GB" and "15 GB," which are the primary volume capacities for those primary volume IDs, in the backup volume information table 61A, and presents those primary volume IDs and primary volume capacities stored in the primary volume information table 61A to the backup destination disk array apparatus 6.

When the backup volume information table 61A is presented to the backup destination disk array apparatus 6, the first management terminal 18 transmits a backup request to the backup destination disk array apparatus 6 (SP8).

The second management terminal 21, receiving the backup request from the first management terminal 18 in the backup source disk array apparatus 4, reads the volume configuration information table 51B, the backup volume information table 61B, the data update state table 71B, and the hash value table 81B from the primary volume configuration information storage volume 50B, the backup volume information storage volume 60B, the update state storage volume 70B, and the hash value storage volume 80B in the storage device 11B respectively, and maintains those tables in the memory (not shown) in the second management terminal 21 (SP9).

The second management terminal 21 allocates a corresponding sub-volume SV in the storage device 11B to the backup target primary volume PV by referring to the presented primary volume IDs and primary volume capacities for those primary volume IDs in the backup volume information table 51A (SP10).

For example, as shown in FIG. 13, the second management terminal 21 refers to "PV4" and "PV5," which are the primary volume IDs in the presented backup volume information table 61, and "25 GB" and "15 GB," which are the primary volume capacities for those primary volume IDs, and allocates sub-volumes SV4 and SV5 having sub-volume capacities "25 GB " and "15 GB" and sub-volume IDs "SV4" and "SV5" in the storage device 11B to the primary volume IDs "PV4" and "PV5."

When the sub-volumes SV4 and SV5 in the storage device 11B are allocated to the primary volume IDs "PV4" and "PV5", the second management terminal 21 sets sub-volume data temporary storage volumes STV4 and STV5 respectively for the sub-volumes SV4 and SV5.

Subsequently, the second management terminal 21 transmits the sub-volume IDs and LUNs (Logical Unit Number (s)) of the sub-volumes as ACK (acknowledge) signals to the first management terminal 18 in the backup source disk array apparatus 4 (SP11).

The first management terminal 18, receiving the ACK signals from the second management terminal 21 in the backup destination disk array apparatus 6, begins the data backup processing (SP12).

When the host computer 2 transmits the job assignment table 31, this job assignment table 31 may not always be updated in the latest state. For example, it can be assumed that the primary volume IDs in the job assignment table 31 in the host computer 2 do not coincide with those in the volume configuration information table 51A in the backup source disk array apparatus 4 because the first management terminal 18 has changed the primary volume IDs in the volume configuration information table 51A.

Therefore, the host computer 2 regularly reads the volume configuration information table 51A from the volume configuration information storage volume 50A in the storage device 11A and maintains the table in the memory (not shown) in the control unit 2A in this host computer 2. If the information in the job assignment table 31 is different from the information in the volume configuration information table 51A, the information in the volume configuration information table 51A is reflected in the job assignment table 31 to constantly update the job assignment table 31 in the latest state.

Also, when the first management terminal 18 reads the volume configuration information table 51A from the volume configuration information storage volume 50A in the storage device 11 A and maintains the table in the memory (not shown) in the control unit 2A in the host computer 2, this volume configuration information table 51 may not always be updated in the latest state. For example, it can be assumed that the primary volume PV stored in the storage device 11B does not coincide with the configuration information stored in the volume configuration information table 51 A because the first management terminal 18 has changed the primary volume PV set in the storage device 11A.

Therefore, the first management terminal 18 regularly refers to each primary volume PV. If the configuration information about each primary volume PV is different from that in the volume configuration information table 51A, the configuration information of each primary volume PV is reflected in the volume configuration information table 51A to constantly update the volume configuration information table 51A in the latest state.

As described above, when data backup is instructed, the first management terminal 18 extracts the primary volume ID for the backup target primary volume PV and the capacity for this primary volume ID from the volume configuration information table 51A and presents them as the backup target primary volume PV to the backup destination disk array apparatus 6. In this manner, even when only the primary volume PV in the backup source disk array apparatus 4 is managed in the backup source disk array apparatus 4 and only the sub-volume SV in the backup destination disk array apparatus 6 is managed in the backup destination disk array apparatus 6, it is possible to make the backup destination disk array apparatus recognize the primary volume and allocate a corresponding sub-volume SV to the primary volume PV when data backup processing is performed.

The first management terminal 18 also presents only the configuration information necessary for performing the data backup processing for the backup target primary volume PV to the backup destination disk array apparatus 6. In this manner, it is possible to enable the backup destination disk array apparatus 6 to refer only to the configuration information necessary for performing the data backup processing for the backup target primary volume PV, from the viewpoint of security.

Moreover, the first management terminal 18 selects the data backup processing job from among the jobs in the job assignment table 31 and sets the primary volume ID assigned the selected job as the backup target primary volume PV. In this manner, the data backup processing can be effectively and easily performed, compared with the case where the primary volumes PVs are each separately selected as the backup target primary volume PV.

(2-2) Data Backup Processing and Data Consistency Confirmation Processing According to the Present Embodiment Next, the data backup processing and the data consistency confirmation processing in the storage system 1 according to the present embodiment will be described. In the storage system 1 according to this embodiment, a hash value is calculated based on the hash function from write data for updating a backup target primary volume in the backup source disk array apparatus 4; another hash value is calculated based on the hash function from write data transmitted from the backup source disk array apparatus 4 in the backup destination disk array apparatus 6; and whether or not the above-calculated hash values coincide with each other is checked.

Figure 14:
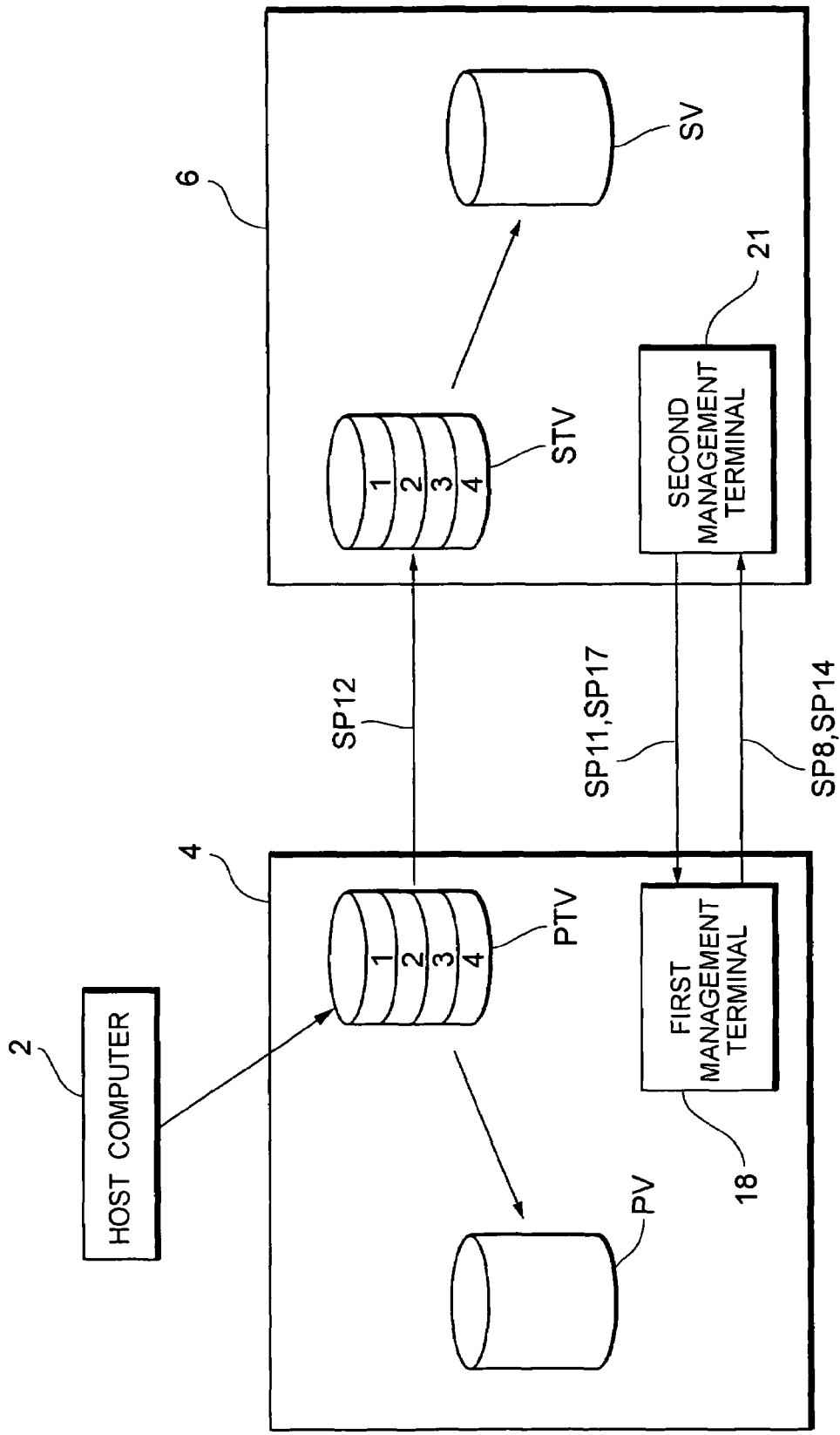
FIG. 14 is a schematic diagram illustrating data backup processing and data consistency confirmation processing.
Figure 15:
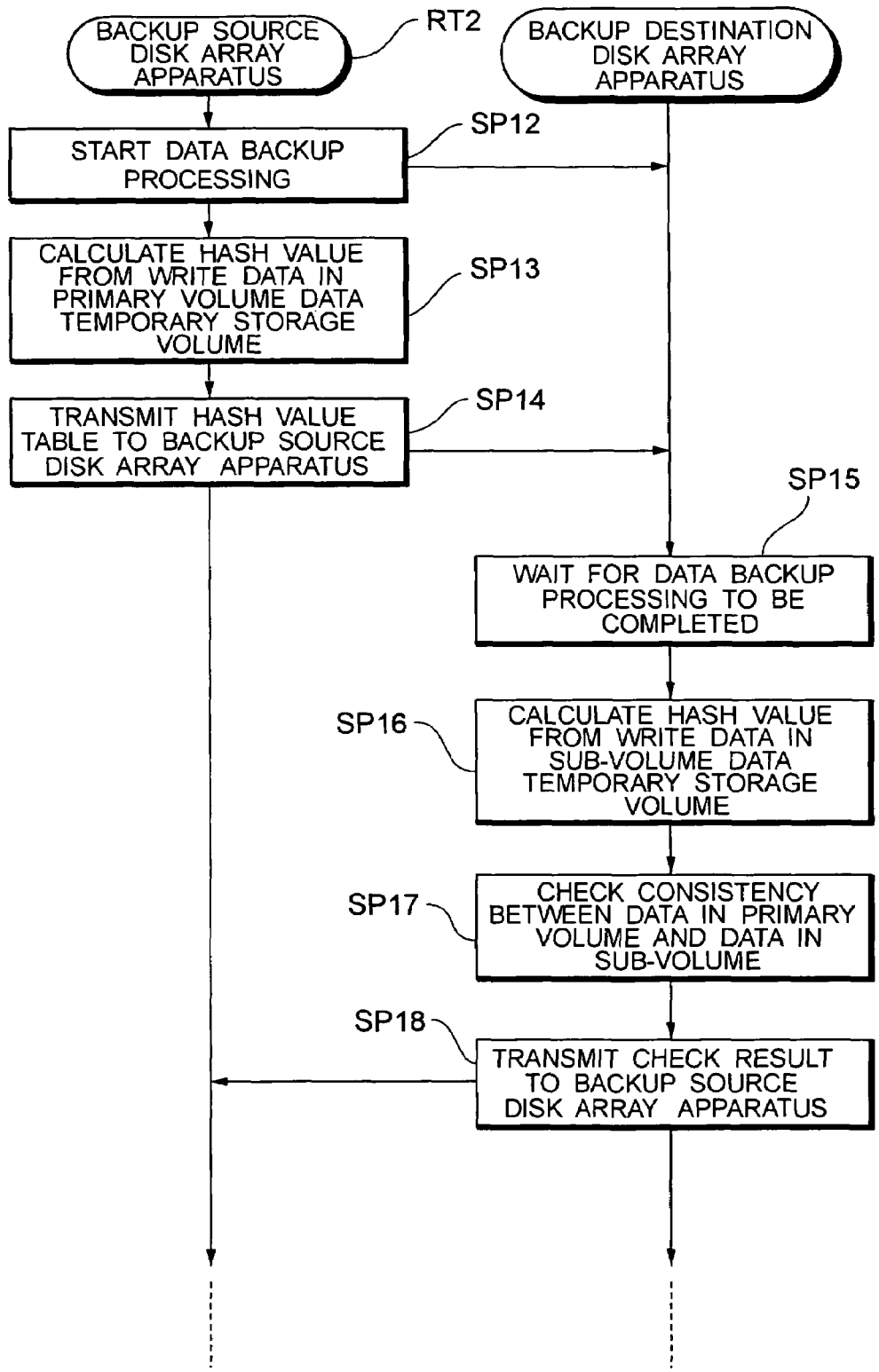
FIG. 15 is a flowchart illustrating a sequence of data backup processing and data consistency confirmation processing.

FIG. 14 is a schematic diagram showing the content of the data backup processing and the data consistency confirmation processing. FIGS. 11 and 12 show the flowchart of the specific sequence of the data backup processing for performing data backup from the backup target primary volume PV in the backup source disk array apparatus 4 to a sub-volume SV in the backup destination disk array apparatus 6, and the data consistency confirmation processing for confirming the consistency between data in the primary volume PV and data in the sub-volume SV.

It is assumed that in the storage system 1, the backup instruction is received, as shown in FIG. 11, when write data 1 to 4 are stored in the primary volume data temporary storage volume PTV; the write data 1 to 4 stored in the primary volume data temporary storage volume PTV are written to the primary volume PVs and the primary volume PV is updated; and there is no un-written write data for the primary volume PV, as shown in the data update state management table 71A in FIG. 8. The write data 1 to 4 stored in the primary volume data temporary storage volume PTV are transferred to the sub-volume data temporary storage volume STV and reflected in the sub-volume SV to update the sub-volume SV, and the data backup processing finishes.

The first management terminal 18 transmits the backup request to the second management terminal 21 in the backup destination disk array apparatus 6 (SP8). After that, the ACK signals are transmitted from the second management terminal 21 (SP11). The first management terminal 18, receiving the ACK signals, begins the data backup processing according to the volume allocation processing sequence RT1 shown in FIG. 14 (SP12).

Specifically, the first management terminal 18 begins to transfer the write data 1 to 4 stored in the primary volume data temporary storage volume PTV to the sub-volume data temporary storage volume STV.

Subsequently, the first management terminal 18 calculates a hash value for the write data that has been written last stored in the primary volume data temporary storage volume PTV, based on a hash function (SP13).

Specifically, the first management terminal 18 stores "write data 4," which is the write data stored in the primary volume data temporary storage volume PTV that has been written last, in a data column 82A in the hash value table 81A, as shown in FIG. 9, calculates a hash value for this "write data 4" based on a hash function, and stores the calculated hash value "xxx" in a hash value column 83A.

After calculating the hash value based on the hash function, the first management terminal 18 transmits the write data that has been written last and the hash value table 81A storing the hash value for this write data to the second management terminal 21 in the backup destination disk array apparatus 6 (SP14). The above processing sequence for calculating the hash value for the write data that has been written last and transmitting the hash value table 81 A may be performed at any time after transmitting the backup request to the second management terminal 21 in the backup destination disk array apparatus 6.

When the first management terminal 18 begins the data backup processing, the second management terminal 21 transfers the write data stored in the primary volume data temporary storage volume PTV to the sub-volume data temporary storage volume STV as needed. The second management terminal 21 then waits for the data backup processing to finish (SP15).

Specifically, the second management terminal 21 constantly monitors the state of the write data stored in the primary volume data temporary storage volume PTV that is transferred to the sub-volume data temporary storage volume STV by using the data update state management table 71B. FIGS. 16 illustrate the data transition in the data update state management table 71B, in which the write data stored in the primary volume data temporary storage volume PTV is transferred to the sub-volume data temporary storage volume STV as needed and reflected in the sub-volume SV, and the sub-volume SV is updated.

In FIG. 16(A), the write data 1 to 3 are stored in the sub-volume data temporary storage volume STV; the write data 1 and 2 have been reflected in the sub-volume SV and the sub-volume SV has been updated; and the write data 3 has not been reflected in the sub-volume SV.

In FIG. 16(B), the write data 1 to 3 are stored in the sub-volume data temporary storage volume STV; all the write data 1 to 3 has been reflected in the sub-volume SV because the write data 3 has been reflected in the sub-volume SV, and the sub-volume SV has been updated.

In FIG. 16(C), write data 4 is stored, and so the write data 1 to 4 are stored in the sub-volume data temporary storage volume STV; the write data 1 to 3 has been reflected in the sub-volume SV and the sub-volume has been updated; and the write data 4 has not been reflected in the sub-volume SV.

In FIG. 16(D), the write data 1 to 4 are stored in the sub-volume data temporary storage volume STV; all the write data 1 to 4 has been reflected in the sub-volume SV because the write data 4 has been reflected in the sub-volume SV, and the sub-volume SV has been updated.

The second management terminal 21 ends the data backup processing when the write data 4 has been reflected in the sub-volume SV and this sub-volume SV has been updated because the above-described backup processing is instructed when the write data 1 to 4 have been reflected in the primary volume PV and the primary volume PV has been updated.

In other words, the second management terminal 21 ends the data backup processing when the write data stored in the data column 82A in the hash value table 81A transmitted from the first management terminal 18 becomes the same as the write data stored in the "to" row in the written data difference column 73B in the data update state management table 71B.

Subsequently, when the data backup processing is finished, the second management terminal 21 calculates a hash value for the write data stored in the sub-volume data temporary storage volume STV that has been written last, based on the hash function (SP16).

Figure 17:
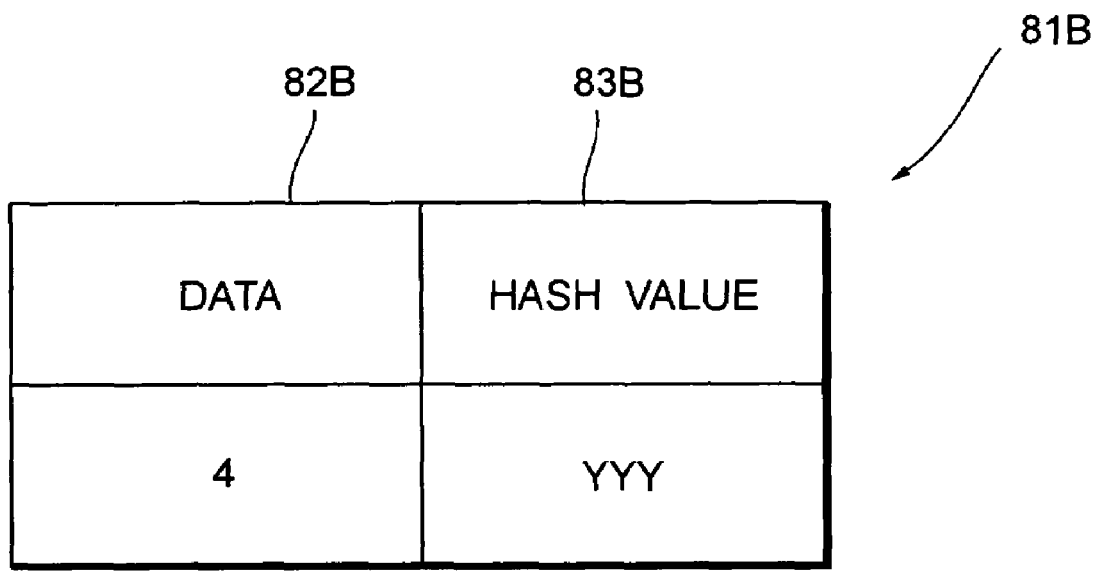
FIG. 17 is a schematic diagram illustrating a hash value table.

Specifically, as shown in FIG. 17, the second management terminal 21 stores "write data 4," which is the write data stored in the sub-volume data temporary storage volume STV that has been written last, in the data column 82B in the hash value table 81B, calculates a hash value for this "write data 4" based on the hash function, and stores the above-calculated hash value "yyy" in the hash value column 83B.

Subsequently, the second management terminal 21 confirms the consistency between the data stored in the primary volume PV and the data stored in the sub-volume SV (SP17).

In this step, the second management terminal 21 checks whether or not the hash value stored in the hash value column 83A in the hash value table 81A coincides with the hash value stored in the hash value column 83B in the hash value table 81B.

Specifically, the second management terminal 21 checks whether or not "xxx," which is the hash value stored in the hash value column 83A in the hash value table 81A, coincides with "yyy," which is the hash value stored in the hash value column 83B in the hash value table 81B.

Subsequently, the second management terminal 21 transmits the result of this check to the first management terminal 18 in the backup source disk array apparatus 4 after checking the consistency between the data stored in the primary volume PV and the data stored in the sub-volume SV (SP18).

In other words, when the second management terminal 21 confirms that the hash value stored in the hash value column 83A in the hash value table 81A coincides with the hash value stored in the hash value column 83B in the hash value table 81B, it confirms that the processing for backing up the data stored in the primary volume PV to the sub-volumes SV has been properly completed, and transmits a data backup completion report to the first management terminal 18. Meanwhile, if those data do not coincide with each other, the second management terminal 18 registers that the data backup processing to the sub-volume SV has failed and transmits a failure report to the first management terminal 18.

As described above, in the storage system 1, the hash value is calculated based on a hash function from write data for updating a backup target primary volume PV in the backup source disk array apparatus 4; another hash value is calculated based on a hash function from write data transmitted from the backup source disk array apparatus 4, in the backup destination disk array apparatus 6; and whether or not those hash values coincide with each other is checked. In this manner, the consistency between the data stored in the primary volume PV and the data stored in the sub-volume SV can be assured even when only the primary volume PV in the backup source disk array apparatus 4 is managed in the backup source disk array apparatus 4; only the sub-volume SV in the backup destination disk array apparatus 6 is managed in the backup destination disk array apparatus 6, and the data in the sub-volume SV cannot be consulted and changed in the backup destination disk array apparatus 6 from a security perspective.

Moreover, in the storage system 1, consistency between the data stored in the primary volume PV and the data stored in the sub-volume SV can be quickly and easily assured by calculating hash values based on a hash function, compared with the case where result values are calculated based on other one-direction functions.

Furthermore, in the storage system 1, the hash value is calculated only for the write data that has been written last stored in the primary volume data temporary storage volume PTV, based on a hash function, not calculating hash values for all write data stored in the primary volume data temporary storage volume PTV. Accordingly, the consistency between the data stored in the primary volume PV and the data stored in the sub-volume SV can be assured further with greater speed and ease.

The present invention is applicable not only to a storage system that performs volume copy between disk array apparatuses, but also to devices that perform various data copying.

I claim:

1. A storage system having a first disk array apparatus that provides one or more first volumes for storing data transmitted from a host computer and is managed by a first management terminal connected to the first disk array apparatus; and a second disk array apparatus that provides one or more second volume for storing backup data of the one or more first volumes and is managed by a second management terminal connected to the second disk array apparatus,
wherein, the first disk array apparatus includes:
a storing unit for storing volume information, which is information about the configuration of the one or more first volumes;
an extracting unit for, when receiving an external backup instruction related to a job, extracting, according to a backup instruction, from the volume information stored in the storing unit, volume information for a backup target volume used by the job as backup volume information, by referring to a job assignment table including a relationship between one or more jobs and the one or more first volumes;
a presenting unit for presenting the backup volume information extracted by the extracting unit to the second disk array apparatus; and
a transmitting unit for transmitting at predetermined times, data from a first temporary storage volume to a second temporary storage volume in the second disk array apparatus, the data having been received from the host computer to be written into the one or more first volumes and being temporarily stored in the first temporary storage volume, and
the second disk array apparatus, which is managed by a second manager other than a first manager managing the first disk array apparatus, and which is executing a backup process different from that executed by the first disk array apparatus, including: an allocating unit for allocating a corresponding second volume to the backup target volume by referring to the backup volume information presented by the presenting unit, and a backing up unit for storing the data which is transmitted from the first disk array apparatus and stored in the second temporary storage volume in the allocated corresponding second volume.

2. The storage system according to claim 1, wherein the extracting unit in the first disk array apparatus extracts only volume information necessary for the second disk array apparatus to back up the backup target volume as the backup volume information from the volume information stored in the storing unit.

3. The storage system according to claim 1, wherein the extracting unit in the first disk array apparatus extracts the volume information about a plurality of the volumes assigned to each job performed by the host computer as the backup volume information from the volume information stored in the storing unit.

4. The storage system according to claim 1,
the first disk array apparatus further comprising:
a first calculating unit for calculating a first parameter based on a one-way function from a last predetermined part of update data for updating data in the first volume transmitted from the host computer; and
a transmitting unit for transmitting the first parameter calculated by the first calculating unit and the update data to the second disk array apparatus,
the second disk array apparatus further comprising:
a second calculating unit for calculating a second parameter based on the one-way function from the last predetermined part of the update data transmitted from the first disk array apparatus; and
a checking unit for checking whether or not the second parameter calculated by the second calculating unit coincides with the first parameter transmitted from the first disk array apparatus.

5. The storage system according to claim 4,
wherein the one-way function is a hash function, and
the first and second parameters are hash values calculated based on the hash function.

6. The storage system according to claim 4,
wherein the first calculating unit calculates the first parameter from the update data that has been transmitted last from the host computer, and
the second calculating unit calculates the second parameter from the update data that has been transmitted last from the first disk array apparatus.

7. A disk array apparatus that provides one or more volumes for storing data transmitted from a host computer and is managed by a first management terminal connected to the disk array apparatus, comprising:

a storing unit for storing volume information, which is information about the configuration of the one or more volumes;

an extracting unit for, when receiving an external backup instruction related to a job, extracting, according to a backup instruction, from the volume information stored in the storing unit, volume information for a backup target volume used by the job as backup volume information by referring to a job assignment table including a relationship between one or more jobs and the one or more volumes; and a presenting unit for presenting the backup volume information extracted by the extracting unit to an external storage device managed by a second manager other than a first manager managing the disk array apparatus, the external storage device being managed by a second management terminal connected to the external storage device and executing a backup process different from that executed by the disk array apparatus, wherein the volume information is used to allocate on the external storage device, a corresponding volume for backing up data of the backup target volume.

8. The disk array apparatus according to claim 7, wherein the extracting unit extracts only volume information necessary for the external storage device to back up the backup target volume as the backup volume information, from the volume information stored in the storing unit.

9. The disk array apparatus according to claim 7, wherein the extracting unit extracts volume information about a plurality of the volumes assigned to each job performed by the host computer as the backup volume information, from the volume information stored in the storing unit.

10. A volume presentation method for a disk array apparatus that provides one or more volumes for storing data transmitted from a host computer, and is managed by a first management terminal connected to the disk array apparatus, comprising:

a first step of, when receiving an external backup instruction related to a job, extracting, according to the backup instruction, from volume information stored in a storing unit for storing the volume information representing the configuration information for the one or more volumes, volume information for a backup target volume used by the job as backup volume information ,by referring to a job assignment table including a relationship between one or more jobs and the one or more volumes; and a second step of presenting the backup volume information extracted in the first step to an external storage device managed by a second manager other than a first manager managing the disk array apparatus, the external storage device being managed by a second management terminal connected to the external storage device and executing a backup process different from that executed by the disk array apparatus, wherein the volume information is used to allocate on the external storage device, a corresponding volume for backing up data of the backup target volume.

11. The volume presentation method according to claim 10, wherein, in the first step, only volume information necessary for the external storage device to back up the backup target volume is extracted as the backup volume information from the volume information stored in the storing unit.

12. The volume presentation method according to claim 10, wherein, in the first step, volume information about a plurality of the volumes assigned to each job performed by the host computer is extracted as the backup volume information from the volume information stored in the storage unit.

\* \* \* \* \*